May 22, 1956  C. L. REESE  2,746,252
SAFETY CYLINDER FOR HYDRAULIC BRAKES
Filed April 13, 1954
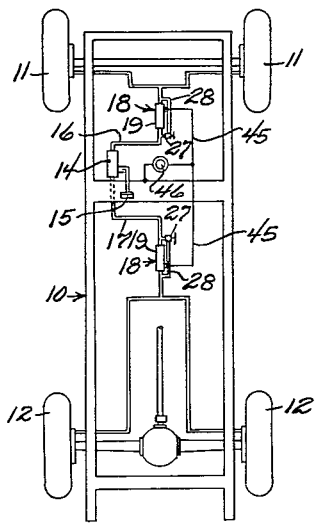
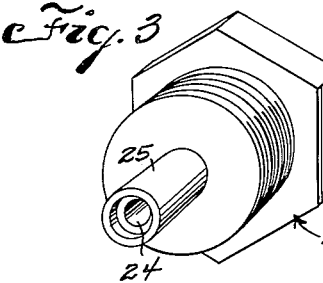
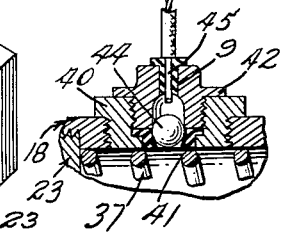
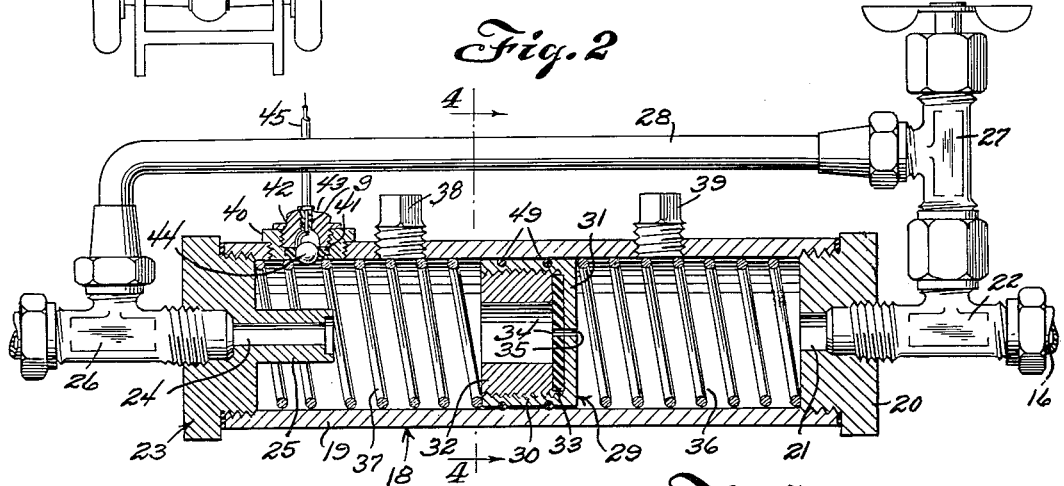
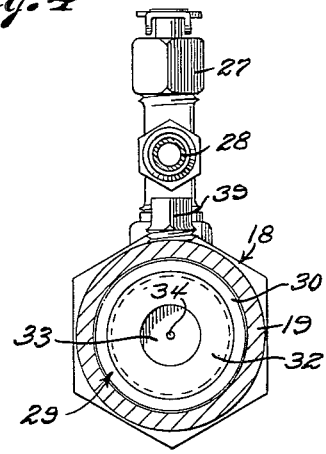
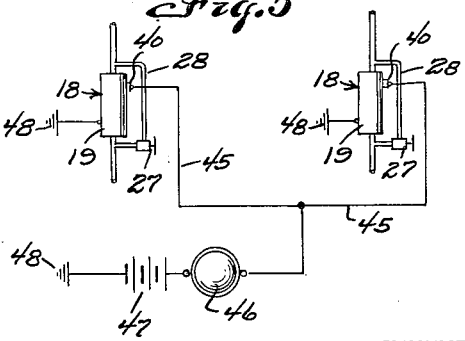
INVENTOR.
Cole L. Reese
BY
Victor J. Evans & Co.
ATTORNEYS

United States Patent Office 2,746,252
Patented May 22, 1956

2,746,252
SAFETY CYLINDER FOR HYDRAULIC BRAKES

Cole Lewis Reese, Dallas, Tex., assignor, by direct and mesne assignments, of twenty-one and one-half per cent to James Henry Stroman, Oklahoma City, Okla., and five per cent to J. Val Connell Application April 13, 1954, Serial No. 422,727

5 Claims. (Cl. 60—54.5)

This invention relates to a vehicle hydraulic brake system, and more particularly to a safety cylinder for a vehicle hydraulic brake system.

The object of the invention is to provide a safety cylinder for hydraulic brakes which will prevent the escape of fluid from the hydraulic brake system in the event a leak occurs, and wherein there will be an indication given to the occupant of the vehicle when a leak occurs.

Another object of the invention is to provide a safety cylinder for hydraulic brakes which will increase the efficiency of operation of the brake system and wherein the safety cylinder is fool-proof, the present invention serving to cut-off completely the fluid flow instantly should a break occur in the line or cups, and wherein there will also be given an indication that trouble within the system such as slow leaks is present.

A further object of the invention is to provide a safety cylinder for hydraulic brakes which is extremely simple and inexpensive to manufacture.

Other objects and advantages will be apparent during the course of the following description.

In the accompanying drawing, forming a part of this application, and in which like numerals are used to designate like parts throughout the same:

Figure 1 is a schematic plan view of a vehicle showing the hydraulic brake system and with the present invention installed therein.

Figure 2 is a longitudinal sectional view taken through one of the safety cylinders.

Figure 3 is a perspective view of one of the end plugs.

Figure 4 is a sectional view taken on the line 4—4 of Figure 2.

Figure 5 is a schematic view showing the wiring diagram for the present invention.

Figure 6 is a fragmentary sectional view illustrating certain constructional details of the apparatus.

Referring in detail to the drawing, the numeral 10 designates a schematic showing in plan of a vehicle such as an automobile or truck, Figure 1, and the vehicle 10 includes front wheels 11, and rear wheels 12. Each of these wheels may be provided with the usual hydraulic wheel cylinders, and there is provided a master cylinder 14 which is adapted to be actuated by a brake pedal 15. Hydraulic lines or conduits 16 and 17 lead from the master cylinder 14 to the wheel brake cylinders. The present invention is directed to a safety cylinder which is designated generally by the numeral 18, and each vehicle may include two of the safety cylinders 18, there being one for the front wheels and one for the rear wheels as shown in Figure 1.

Each of the safety cylinders 18 has the same construction and each includes a hollow housing 19, Figure 2. A plug 20 is arranged in threaded engagement with one end of the housing 19, and the plug 20 is provided with a central opening or port 21. A T-fitting 22 is arranged in engagement with the plug 20 and communicates with the port 21, and a plug 23 threadedly engages the other end of the housing 19. The plug 23 is provided with a central port or opening 24, and an extension 25 projects inwardly from the plug 23. A T-fitting 26 is arranged in engagement with the plug 23, and a bypass line 28 leads from the fitting 26 to a manually operable valve 27 that is connected to the fitting 22.

Movably or reciprocably arranged in the housing 18 is a piston 29 which includes an annular side wall 30 and an end wall 31. A cylindrical hollow sleeve 32 threadedly engages the inner surfaces of the side wall 30, and a resilient disc 33 is interposed between the sleeve 32 and the end wall 31, Figure 2. The disc 33 is provided with a central aperture 34 which registers with a central aperture 35 in the end wall 31 for a purpose to be later described.

Positioned in the housing 19 is a pair of coil springs 36 and 37. The coil spring 36 is interposed between the plug 20 and the piston 29, while the other coil spring 37 is interposed between the piston 29 and the plug 23. These coil springs serve to equalize the piston 29 so that the piston 29 has a tendency to remain centered in the housing 19 as shown in Figure 2.

Detachably connected to the housing 19 is a pair of vent plugs 38 and 39. A bushing 40 is arranged in threaded engagement with the housing 19, and the bushing 40 carries a resilient flexible flange 41 made of insulation material which has a contact ball 44 seated therein. A body member or base member 42 is arranged in threaded engagement with the bushing 40, and the body member 42 is provided with a socket 43 which is adapted to receive the ball 44 when the piston 29 moves from its intermediate position shown in Figure 2 to the left end of the housing 19. A wire 45 electrically connects the body member 42 to an indicator light 46 which may be mounted on the dashboard of the vehicle when the ball 44 is pushed into contact with the said wire by the piston 29, and a suitable source of electrical energy such as the vehicle battery 47 may be connected to the indicator bulb 46 and to a ground connection at 48, Figure 5. Suitable ring members 49 may be seated in annular recesses in the side wall 30 of the piston 29 so as to insure that there will be a tight fit between the piston and the inner surface of the side wall of the housing 19.

From the foregoing it is apparent that there has been provided a safety cylinder for hydraulic brakes which will increase the efficiency of operation of the wheel cylinder lines and which is simple in operation and inexpensive and easy to manufacture. The device is foolproof and the safety cylinder 18 is positioned between the usual master cylinder 14 and the four wheel cylinders so that in the event that a break or leak occurs in any one of the four lines between the master cylinder 14 and a wheel cylinder, the escaping fluid in the defective line will be trapped and cut-off between the safety cylinder and the master cylinder. Thus, further leakage at this point will be prevented and sufficient fluid will be reserved in the remaining lines to provide brakes sufficient for ordinary stoppage purposes. In use, the safety cylinder 18 embodies the piston 29 which is slidably mounted inside the cylinder and the piston is held normally in the center of the cylinder by means of the two springs 36 and 37 which are of equal tension and size. When the brakes are applied, pressure in the cylinder forces the piston 29 toward the wheel brakes about one-half inch to one inch. When pressure is released by releasing the brake pedal 15, the two springs 36 and 37 inside the cylinder will equalize the piston 29 to a central position within the cylinder. In the event that a brake line cracks or breaks, or if the brake hoses should become damaged enough to cause leakage, or if the wheel cylinder cup becomes faulty to cause leakage of brake fluid, or if any other leak occurs, there will be no pressure buildup beyond the piston. When the brakes are applied the piston 29 will automatically travel all the way to the end of the cylinder 18 so that it is contiguous to the plug 23 whereby the piston will receive or be seated on the projection 25 which extends inwardly from the plug 23. Thus, all fluid flow will be closed. The disc 33 may be made of a suitable material such as neoprene to insure that there will be a positive seal. Then, pressure will buildup on the other wheels to provide that the braking power will still be in effect on these other wheels. As the piston 29 travels along the cylinder from the intermediate position shown in Figure 2 to a position contiguous to the plug 23, it will close the electrical circuit since the ball 44 will be moved into the socket 43 whereby the circuit to the warning light 46 will be completed.

The apertures 34 and 35 are very small and only permit two or three drops of brake fluid to pass through and this permits or compensates for expansion or small leaks which might arise within the braking system especially in older model vehicles. Very little pressure is needed to completely close the brake line and with the master cylinder full or partially full of fluid, the brakes can be applied on the remaining wheels in operation from fifty to one hundred or more times before the master cylinder is emptied. It is believed that fifty to one hundred times of brake application will be sufficient to enable the operator of the vehicle to locate a garage or service agency for brake repairs.

The bypass line 28 is provided and this is used only at the time that the lines and cylinders are filled. This is accomplished at the initial installation of the unit or at such time as brake repairs are made and the fluid is emptied from the braking system. The bypass valve 27 is then opened and fluid is allowed to completely fill the cylinder 18. The bleeding valves or plugs 38 and 39 are provided for bleeding off all air from the cylinder for perfect operation. The valve 27 is then closed and remains closed during normal use of the vehicle.

The present invention will completely cut-off the fluid flow instantly should an immediate break occur in the lines or cups, and it will also serve as a detector of trouble within the system such as slow leaks which cannot ordinarily be detected until the entire braking system is lost by fluid loss. Furthermore, slow leaks will force the piston 29 to gradually move toward the electric contact unit 44 and the warning light 46 will enable the operator to secure repairs at once.

The present invention will work on older vehicles as well as new vehicles due to the provision of the leakage apertures 34 and 35. There is provided the rubber sealing rings 49 around the piston 29 and the holes 34 and 35 extending through the piston permit approximately one drop of leakage therethrough. By having compensation for leakage, the unit will be much safer. Thus, should the fluid behind the piston 29 ever be lost through the slowest of leaks, usually at the wheel cups, the entire system will lock without warning and under certain conditions, this could prove disastrous. The present invention provides for refill for any such leakage directly from the master cylinder.

Very few vehicles are free of any brake deficiency, mechanically speaking. In fact, a great majority of brand new vehicles can spring a leak around the cylinder wheel cups very easily and usually do. If the safety cylinder were leak-proof, the fluid behind the piston would gradually be lost a drop at a time until sooner or later the brakes on the vehicle will lock completely as the cylinder will lose all of its fluid and defeat the purpose for which it is intended. Thus, the unit would then be more dangerous than if it were not on the vehicle since complete breakage would occur when the vehicle is in operation and this could easily cause an accident. However, all of these disadvantages are overcome or eliminated by providing the apertures 34 and 35 which permit a drop or two of fluid to pass therethrough so that there will always be fluid within the unit at all times. Thus, should fluid be lost behind the piston, it will be replenished gradually by slow leak process and if leakage occurs at a greater rate, the unit will function as intended and automatically cut-off the fluid flow entirely. The springs 36 and 37 equalize the piston in the cylinder 18.

I claim:

1. A safety cylinder for a hydraulic brake, comprising a hollow housing, a first plug member detachably connected to an end of said housing and having an inwardly projecting extension thereon, said first plug member being provided with a central port therein, a second plug member detachably connected to the other end of said housing and provided with a longitudinally extending central port, a T-fitting connected to each of the ports in said plug members, a manually operable valve connected to the T-fitting engaging said second plug member, a bypass line extending between the T-fitting engaging said first plug member and said valve, a piston reciprocably arranged in said cylinder and including an end wall and an annular side wall, said piston receiving said extension when said piston moves to a position contiguous to first plug member, a hollow cylindrical sleeve detachably engaging the inner surface of said side wall, a resilient disk interposed between said sleeve and end wall, there being registering openings in said disc and end wall, a pair of vent plugs detachably engaging said housing and arranged in spaced apart relation with respect to each other, said vent plugs being normally arranged on opposite sides of the piston when the piston is in a central position in the cylinder, a pair of coil springs positioned in said housing on opposite sides of said piston, a bushing detachably connected to said housing and arranged adjacent said first plug member, an insulated flexible flange seated in said bushing, a base member arranged in engagement with said bushing and provided with a socket, a wire leading from said base member, an indicator light connected to said wire and adapted to be mounted on the dash board of a vehicle, and a contact ball carried by said flange and mounted for movement into and out of said socket for selectively closing the circuit to said indicator light.

2. A safety cylinder for a fluid pressure brake, comprising a hollow housing, a first plug member detachably connected to an end of said housing and having an inwardly projecting extension thereon, said first plug member being provided with a port therein, a passage in said extension connecting said port with the interior of said hollow housing, a second plug member detachably connected to the other end of said housing and provided with a longitudinally extending port, a fitting connected to each of the ports in said plug members, a manually operable valve connected to the fitting engaging said second plug member, a by-pass line extending between the fitting engaging said first plug member and said valve, a piston reciprocably arranged in said cylinder and including an end wall and an annular side wall, said piston receiving said extension when said piston moves to a position contiguous to said first plug member, a hollow cylindrical sleeve detachably engaging the inner surface of said side wall, a resilient disc interposed between said sleeve and end wall, there being openings in said disc and end wall registering with each other and with said passage, a pair of vent plugs detachably engaging said housing and arranged in spaced apart relation with respect to each other, said vent plugs being normally arranged on opposite sides of the piston when the piston is in a central position in the cylinder, a pair of springs positioned in said housing on opposite sides of said piston, a bushing detachably connected to said housing adjacent said first plug member, an insulated flexible flange seated in said bushing, a base member arranged in engagement with said bushing and provided with a socket, a wire leading from said base member, an indicator light connected to said wire and adapted to be mounted on the dashboard of a vehicle, and a contact ball carried by said flange and mounted for movement into and out of said socket by said piston for selectively closing the circuit to said indicator light.

3. A safety cylinder for a fluid pressure brake, comprising a hollow housing, a first plug member detachably connected to an end of said housing and having an inwardly projecting extension thereon, said first plug member being provided with a port therein, a passage in said extension connecting said port with the interior of said hollow housing, a second plug member detachably connected to the other end of said housing and provided with a longitudinally extending port, a fitting connected to each of the ports in said plug members, a valve connected to the fitting engaging said second plug member, a by-pass line extending between the fitting engaging said first plug member and said valve, a piston reciprocably arranged in said cylinder and including an end wall and an annular side wall, said piston receiving said extension when said piston moves to a position contiguous to said first plug member, a member detachably engaging the inner surface of said side wall, a resilient disc interposed between said member and end wall, there being openings in said disc and end wall registering with each other and with said passage, a pair of vent plugs detachably engaging said housing and arranged in spaced apart relation with respect to each other, said vent plugs being normally arranged on opposite sides of the piston when the piston is in a central position in the cylinder, a pair of springs positioned in said housing on opposite sides of said piston, a bushing detachably connected to said housing adjacent said first plug member, an insulated flexible flange seated in said bushing, a base member arranged in engagement with said bushing and provided with a socket, a wire leading from said base member, an indicator light connected to said wire and adapted to be mounted on the dashboard of a vehicle, and a contact ball carried by said flange and mounted for movement into and out of said socket by said piston for selectively closing the circuit to said indicator light.

4. A safety cylinder for a fluid pressure brake, comprising a hollow housing, a first plug member detachably connected to an end of said housing and having an inwardly projecting extension thereon, said first plug member being provided with a port therein, a passage in said extension connecting said port with the interior of said hollow housing, a second plug member detachably connected to the other end of said housing and provided with a longitudinally extending port, a fitting connected to each of the ports in said plug members, a valve connected to the fitting engaging said second plug member, a by-pass line extending between the fitting engaging said first plug member and said valve, a piston reciprocably arranged in said cylinder and including an end wall and an annular side wall, said piston receiving said extension when said piston moves to position contiguous to said first plug member, a member detachably engaging the inner surface of said side wall, a resilient disc interposed between said member and end wall, there being openings in said disc and end wall registering with each other and with said passage, means for venting and filling the cylinder on opposite sides of the piston, a pair of springs positioned in said housing on opposite sides of said piston, a bushing detachably connected to said housing adjacent said first plug member, an insulated flexible flange seated in said bushing, a base member arranged in engagement with said bushing and provided with a socket, a wire leading from said base member, an indicator light connected to said wire and adapted to be mounted on the dashboard of a vehicle, and a contact ball carried by said flange and mounted for movement into and out of said socket by said piston for selectively closing the circuit to said indicator light.

5. A safety cylinder for a fluid pressure brake, comprising a hollow housing, a first plug member detachably connected to an end of said housing and having an inwardly projecting extension thereon, said first plug member being provided with a port therein, a passage in said extension connecting said port with the interior of said hollow housing, a second plug member detachably connected to the other end of said housing and provided with a longitudinally extending port, a fitting connected to each of the ports in said plug members, a valve connected to the fitting engaging said second plug member, a by-pass line extending between the fitting engaging said first plug member and said valve, a piston reciprocably arranged in said cylinder and including an end wall and an annular side wall, said piston receiving said extension when said piston moves to a position contiguous to said first plug member, a member detachably engaging the inner surface of said side wall, a resilient disc interposed between said member and end wall, there being openings in said disc and end wall registering with each other and with said passage, means for venting and filling the cylinder on opposite sides of the piston, a pair of springs positioned in said housing on opposite sides of said piston, a bushing detachably connected to said housing adjacent said first plug member, an insulated flexible flange seated in said bushing, a base member arranged in engagement with said bushing and provided with a socket, a wire leading from said base member, a signal device connected to said wire, and a contact element carried by said flange and mounted for movement into and out of said socket by said piston for selectively closing the circuit to said signal device.

References Cited in the file of this patent

UNITED STATES PATENTS

| Number | Name | Date |
|---|---|---|
| 1,831,081 | Smith | Nov. 10, 1931 |
| 2,077,646 | Snyder | Apr. 20, 1937 |
| 2,093,015 | Madden | Sept. 14, 1937 |
| 2,238,124 | Mathieson | Apr. 15, 1941 |
| 2,239,348 | Wirtanen et al. | Apr. 22, 1941 |
| 2,581,792 | Goodell | Jan. 8, 1952 |
| 2,674,095 | Kirk | Apr. 6, 1954 |

FOREIGN PATENTS

| 460,859 | Canada | Nov. 8, 1949 |